United States Patent
Voigt et al.

(10) Patent No.: US 10,392,195 B2
(45) Date of Patent: Aug. 27, 2019

(54) SCRAPING ELEMENTS FOR DRIVE UNITS OF UNDERGROUND MINING APPLICATIONS

(71) Applicant: Caterpillar Global Mining Europe GmbH, Lünen (DE)

(72) Inventors: Robert Voigt, Bochum (DE); Karl-Heinz Schürer, Herne (DE); William R. Weber, Allison Park, PA (US)

(73) Assignee: Caterpillar Global Mining Europe GmbH, Lunen (DE)

( * ) Notice: Subject to any disclaimer, the term of this patent is extended or adjusted under 35 U.S.C. 154(b) by 0 days.

(21) Appl. No.: 15/324,172

(22) PCT Filed: Jul. 20, 2015

(86) PCT No.: PCT/EP2015/001486
§ 371 (c)(1),
(2) Date: Jan. 5, 2017

(87) PCT Pub. No.: WO2016/015838
PCT Pub. Date: Feb. 4, 2016

(65) Prior Publication Data
US 2017/0197793 A1    Jul. 13, 2017

(30) Foreign Application Priority Data
Jul. 31, 2014    (EP) .................................. 14179411

(51) Int. Cl.
*B65G 23/06*    (2006.01)
*B65G 39/09*    (2006.01)
(Continued)

(52) U.S. Cl.
CPC ............. *B65G 23/06* (2013.01); *B65G 39/09* (2013.01); *E21C 29/10* (2013.01); *E21F 13/00* (2013.01);
(Continued)

(58) Field of Classification Search
CPC ............................... B65G 23/06; B65G 39/09
(Continued)

(56) References Cited

U.S. PATENT DOCUMENTS

| 1,163,045 A | 12/1915 | Symons |
| 2,395,147 A | 2/1946 | Saxe |

(Continued)

FOREIGN PATENT DOCUMENTS

| DE | 19619821 | 11/1997 |
| DE | 202004002741 | 4/2004 |

(Continued)

OTHER PUBLICATIONS

European Search Report dated Apr. 24, 2015, issued in EP 14179411 (4 pages).

(Continued)

*Primary Examiner* — Joseph A Dillon, Jr.

(57) ABSTRACT

A sprocket adapted to be used in a drive unit of a chain conveyor for underground mining applications is disclosed. The sprocket may have a cylindrical body. The cylindrical body may have a front face, an axis of rotation (A-A'), and a lateral surface. The sprocket may also have a scraping member provided on the front face. The scraping member may scrape off deposits during rotation of the sprocket.

6 Claims, 8 Drawing Sheets

(51) Int. Cl.
  *E21C 29/10* (2006.01)
  *E21F 13/06* (2006.01)
  *E21F 13/00* (2006.01)
  *F16C 35/04* (2006.01)
  *B65G 45/12* (2006.01)
  *B65G 45/14* (2006.01)

(52) U.S. Cl.
  CPC .......... *E21F 13/066* (2013.01); *F16C 35/042* (2013.01); *B65G 45/12* (2013.01); *B65G 45/14* (2013.01)

(58) Field of Classification Search
  USPC .......................................... 198/834; 474/164
  See application file for complete search history.

(56) References Cited

U.S. PATENT DOCUMENTS

| | | | |
|---|---|---|---|
| 3,476,396 A | 11/1969 | Buhl | |
| 3,545,582 A | 12/1970 | Kimmen | |
| 3,946,859 A | 3/1976 | Jeffrey et al. | |
| 4,037,713 A | 7/1977 | Soliman et al. | |
| 4,346,801 A | 8/1982 | Redder et al. | |
| 4,346,938 A | 8/1982 | Braun | |
| 4,437,564 A * | 3/1984 | Redder | B65G 23/06 198/834 |
| 4,817,786 A | 4/1989 | Doerr et al. | |
| 4,913,279 A | 4/1990 | Tonissen | |
| 4,953,692 A * | 9/1990 | Stoppani | B65G 19/285 198/834 |
| 8,235,850 B2 * | 8/2012 | Lin | B62M 9/105 474/160 |
| 8,245,837 B2 | 8/2012 | Eversole | |
| 2006/0037844 A1 | 2/2006 | Pluszynski et al. | |
| 2007/0072715 A1 * | 3/2007 | Hinterstocker | F01L 1/02 474/152 |
| 2012/0000752 A1 | 1/2012 | Kruger | |
| 2012/0213458 A1 * | 8/2012 | Zuiko | B65G 39/09 384/91 |
| 2014/0251765 A1 * | 9/2014 | Weichbrodt | B65G 13/02 198/780 |

FOREIGN PATENT DOCUMENTS

| | | |
|---|---|---|
| GB | 898165 | 6/1962 |
| GB | 1491407 A | 11/1977 |
| GB | 2239644 | 7/1997 |
| GB | 2410516 | 8/2005 |
| JP | 2009-287785 | 12/2009 |
| JP | 2010-196830 | 9/2010 |

OTHER PUBLICATIONS

International Search Report dated Apr. 21, 2016, issued in PCT/EP2015/001486 (3 pages).

* cited by examiner

SCRAPING ELEMENTS FOR DRIVE UNITS OF UNDERGROUND MINING APPLICATIONS

CLAIM FOR PRIORITY

This application is a U.S. National Phase entry under 35 U.S.C. § 371 from PCT International Application No. PCT/EP2015/001486, filed Jul. 20, 2015, which claims benefit of priority of European Patent Application No. 14179411.5, filed Jul. 31, 2014, all of which are incorporated herein by reference.

TECHNICAL FIELD

The present invention relates to a drive unit for chain conveyors of underground mining applications including a sprocket and a bearing housing. More particularly, the present invention relates to a scraping member disposed within a seal gap between the sprocket and the bearing housing for scraping off deposits accumulated in the seal gap.

BACKGROUND

A known problem of material mining, such as rock or coal mining, is the high amounts of particulates produced during mining. These particulates are often abrasive and may cause wear to mining components which are exposed to these particulates, such as a drive unit for a chain scraper conveyor or a plough chain conveyor. Such a drive unit typically includes a bearing housing accommodating a bearing for supporting a drive shaft of the drive unit. The drive unit further includes a sprocket drivably connected to the drive shaft and configured to drive a conveyor chain of the chain conveyor. A narrow gap between the bearing housing and the sprocket—usually referred to as a seal gap—enables the sprocket to rotate freely relative to the bearing housing. Particulates produced during mining may enter that seal gap, get trapped and eventually clog up the seal gap. As a result, the bearing may be subjected to material wear which may result in a reduced lifetime or even failure of this component.

Various seal arrangements for rotary bearing devices are known, for example, from U.S. Pat. Nos. 2,395,147 A, 8,245,837 B2, 1,163,045 A, 3,545,582 A, 3,476,396 A, 4,913,279 A, JP 2009287785 A and JP 2010196830 A. The latter, for example, shows a roller bearing device for improving a seal function by adding a structure for removing foreign matter.

Sprockets used in drive units are known, for example, from U.S. Pat. Nos. 4,346,938 A, 3,946,859 A.

The present disclosure is directed, at least in part, to improving or overcoming one or more aspects of prior systems.

SUMMARY OF THE DISCLOSURE

According to one aspect of the present disclosure, a sprocket adapted to be used in a drive unit of a chain conveyor for underground mining applications is disclosed. The sprocket comprises a cylindrical body having a front face, an axis of rotation, and a lateral surface. The sprocket further comprises a scraping member provided on the front face, and configured to scrape off deposits during rotation of the sprocket.

According to another aspect of the present disclosure, a bearing housing adapted to be used in a drive unit of a chain conveyor for underground mining applications is disclosed. The bearing housing comprises a cylindrical body including a front face and a lateral surface. The bearing housing further comprises a scraping member provided on the front face.

According to another aspect of the present disclosure, a scraping member provided on a cylindrical body including a lateral surface, an axis of rotation, a front face, and a circumferential inner face is disclosed. The scraping member is configured to scrape off deposits during rotation of the cylindrical body and comprises at least one radial scraping edge provided on the front face of the cylindrical body. The at least one radial scraping edge includes a first end and a second end, wherein the first end and the second end have different radial distances from the axis of rotation, and wherein the first end and the second end confine a polar angle in the range from 0° to less than 180°.

According to another aspect of the present disclosure, a drive unit is disclosed. The drive unit comprises a bearing housing for accommodating a bearing, wherein the bearing is configured to support a drive shaft of the drive unit. The drive unit further comprises a sprocket operably connected to the drive shaft, wherein the sprocket includes a central bore with a circumferential inner face, and wherein the sprocket is rotatable relative to the bearing housing, separated from the bearing housing by a seal gap. The bearing housing further comprises an annular protrusion with a circumferential outer face. The circumferential outer face is configured to extend at least partially into the central bore of the sprocket, wherein the circumferential outer face and the circumferential inner face overlap by at least 20 mm, such as 30 mm, and wherein the sprocket is configured as exemplary disclosed herein, and/or wherein the bearing housing is configured as exemplary disclosed herein.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings.

DETAILED DESCRIPTION

Figure 1:
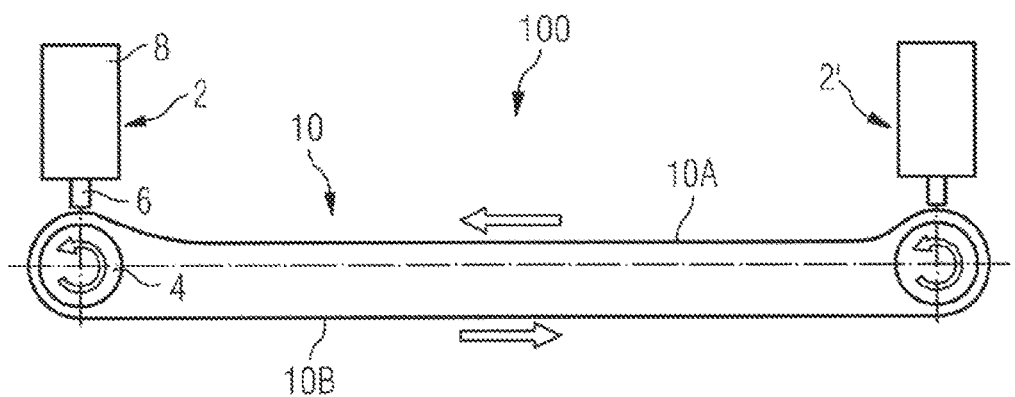
FIG. 1 is a schematic view of an exemplary chain conveyor including a drive unit.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that drive units subjected to particulate contamination of a seal gap between a sprocket and a bearing housing of the drive unit may be protected against that contamination by providing a scraping member disposed within the seal gap for scraping off accumulated particulates (deposits).

The present disclosure is further based in part on the realization that a scraping edge provided on the scraping member may define a deposit removal path for the scraped off particulates to leave the seal gap.

The present disclosure is further based in part on the realization that by locally increasing a width of the seal gap, scraped off particulates may be removed at a reduced flow resistance.

The present disclosure is further based in part on the realization that by guiding the scraped off particulates towards the locally widened seal gap, removal of scraped off particulates may be improved.

Referring now to the drawings, FIG. 1 shows an exemplary chain conveyor 100 for underground mining applications. Chain conveyor 100 comprises a drive unit 2 configured to drive a conveyor chain 10 in the direction as illustrated by the arrows. Conveyor chain 10 may be an endless chain with an upper run 10A and a lower run 10B. In case of a face or drift conveyor, chain conveyor 100 may be designed as a chain scraper conveyor and the conveyor chain 10 may be a scraper chain. In case of a plough system, conveyor chain 10 may be a plough chain and configured to convey a coal plough (not shown) on upper run 10A along a working face of a coal seam. The skilled person will however appreciate that chain conveyor 100 may be any suitable chain conveyor.

Drive unit 2 comprises a sprocket 4 configured to engage with conveyor chain 10. Sprocket 4 is drivably connected to a drive shaft 6 of drive unit 2. In FIG. 1 drive shaft 6 is shown to be connected to sprocket 4 from on top of sprocket 4. However, this arrangement is for illustrative purposes only. In practice, drive shaft 6 is connected to sprocket 4 from behind of sprocket 4, as will be seen in FIG. 2.

Drive unit 2 further comprises a bearing housing 8. Bearing housing 8 accommodates a bearing configured to support drive shaft 6. Drive unit 2 may be flanged onto a motor (not shown), such as a synchronous motor or frequency converter motor. The motor drives drive shaft 6 and may additionally include gear stages, overload clutches, and the like.

In some embodiments, a second drive unit 2' may be used as an auxiliary drive for chain conveyor 100.

Figure 2:
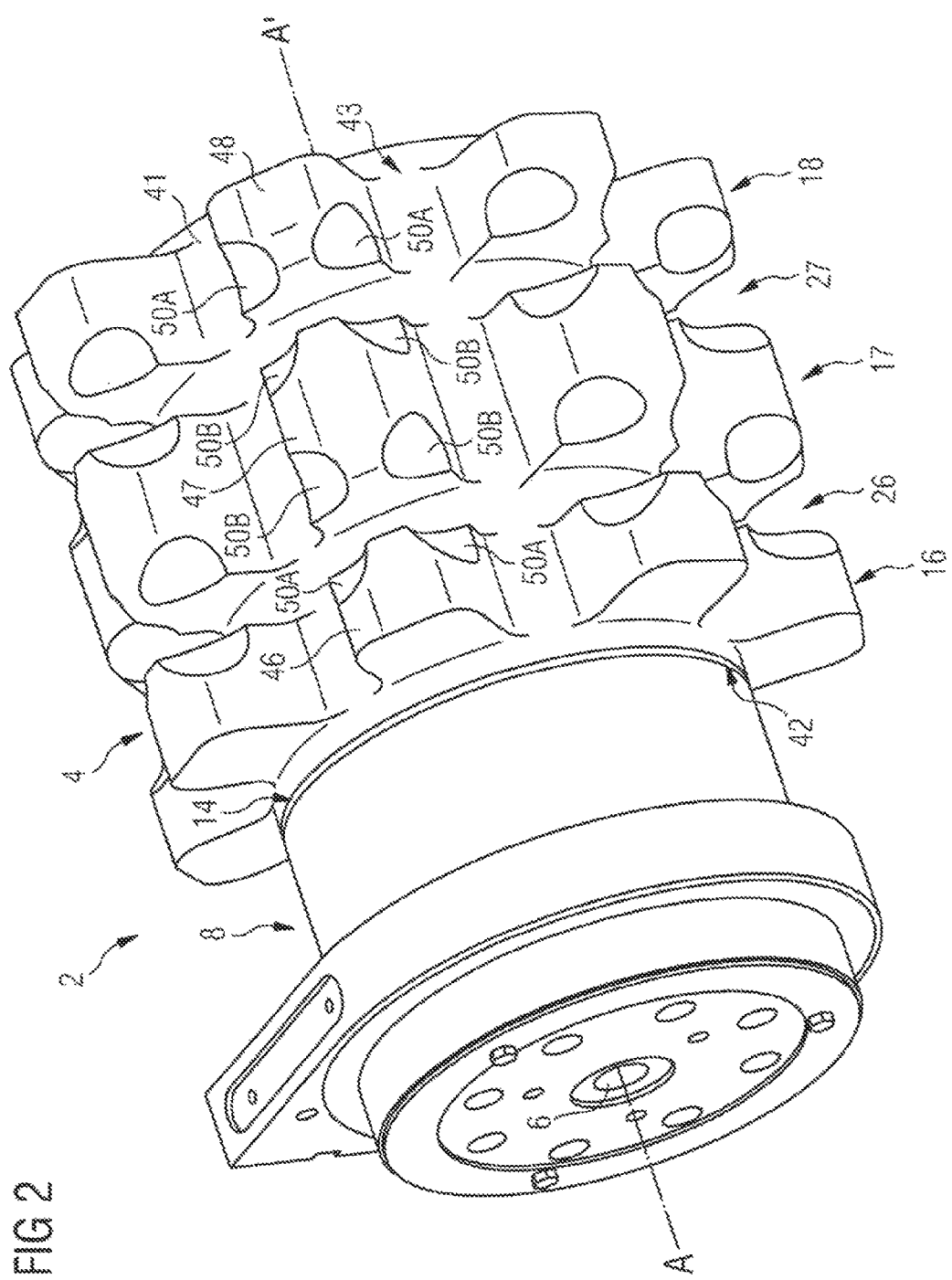
FIG. 2 is a perspective view of an exemplary drive unit including a bearing housing and a sprocket.

FIG. 2 shows drive unit 2 in a perspective view. As can be seen, sprocket 4 and bearing housing 8 are coaxially arranged about drive shaft 6 to form a compact unit. Sprocket 4 and bearing housing 8 are further separated from each other by a seal gap 14. Seal gap 14 allows sprocket 4 to rotate freely relative to bearing housing 8.

Sprocket 4 comprises a cylindrical body 41 with a lateral surface 43, an axis of rotation A-A', and a front face 42. Sprocket 4 further comprises three rings 16, 17, 18 with a plurality of identically-structured tooth elements 46, 47, 48. Tooth elements 46, 47, 48 are configured to engage with chain links (not shown) of conveyor chain 10 and are each disposed at a distance from one another to accommodate the chain links.

Rings 16, 17, 18 are further disposed axially offset to one another such that the chain links can reach through an intermediate space 26, 27 between rings 16, 17, 18 without supporting themselves on the tooth elements 46, 47, 48. Tooth elements 46, 47, 48 and chain links contact each other in flank pockets 50 provided on flanks of the tooth elements. In FIG. 2 tooth elements 46, 48 are exemplarily shown as single teeth elements having two flank pockets 50A each, whereas tooth elements 47 are shown as double teeth elements with four flank pockets 50B each. All flank pockets 50 may have the same geometry, so that sprocket 4 does not have a preferred running direction.

In some embodiments, sprocket 4 may additionally comprise wear inlays (not shown). The wear inlays may be disposed in flank pockets 50 of tooth elements 46, 47, 48 and may be made from a wear-resistant material, such as manganese hardened steel. By using wear inlays, material wear in the contact area between tooth elements 46, 47, 48 and the chain links may be reduced. In some embodiments, tooth elements 46, 47, 48 may be entirely made from wear-resistant material and may be removably attached to cylindrical body 41, so that worn down teeth may be replaced without the need to replace sprocket 4.

Figure 3:
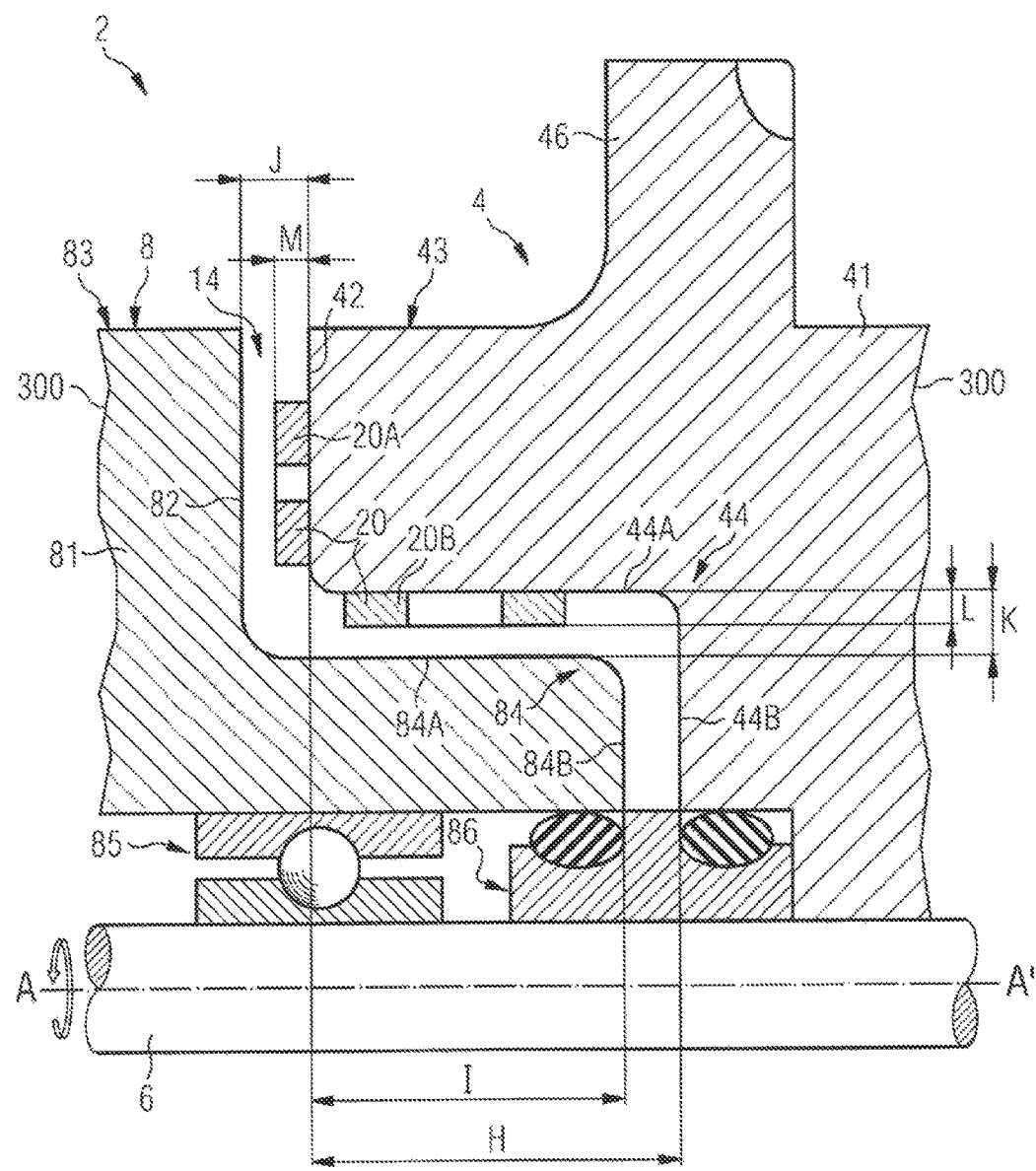
FIG. 3 is a schematic cross-sectional view along the axis A-A' of the drive unit of FIG. 2.

FIG. 3 is a schematic cross-sectional view of drive unit 2 of FIG. 2 and was performed along the axis of rotation A-A'. For clarity, only a section of the cross-sectional view is shown, as indicated by the lines 300 at the left and right end of the cross-sectional view.

FIG. 3 shows more clearly seal gap 14 between sprocket 4 and bearing housing 8. Sprocket 4 may additionally comprise a central bore 44 extending from front face 42 into cylindrical body 41. Central bore 44 comprises a circumferential inner face 44A and a shoulder face 44B and may extend into cylindrical body 41 by a distance H. Sprocket 4 may be drivably connected to drive shaft 6 of drive unit 2, such that during operation of drive shaft 6, sprocket 4 rotates around the axis of rotation A-A'.

Bearing housing 8 is positioned adjacent to sprocket 4 separated by seal gap 14 with a width J. Bearing housing 8 accommodates a bearing 85 configured to support drive shaft 6 of drive unit 2. Bearing 85 may be any known type of bearing suitable for supporting drive shaft 6, such as a tapered roller bearing, spherical roller bearing, or the like. Bearing housing 8 may accommodate additional bearing devices not shown in FIG. 3. Bearing 85 may further be sealed against particulates entering bearing 85 using any known type of a shaft seal 86, such as a rotating mechanical seal, or the like.

Bearing housing 8 may further comprise a cylindrical body 81 with a front face 82 and a lateral surface 83. On front face 82 an annular protrusion 84 may be formed including a circumferential outer face 84A and a protrusion face 84B. Annular protrusion 84 may extend at least partially into central bore 44 of sprocket 4, thereby causing an overlap I between circumferential outer face 84A and circumferential inner face 44A. Overlap I may result in increasing an effective length of seal gap 14, thereby decreasing a likelihood of particulates to enter bearing 85.

Overlap I may be at least 20 mm, such as about 30 mm, in some embodiments more than 30 mm. Seal gap 14 between front face 42 and front face 82 may have a width J of at least 2 mm, such as 3 mm. Whereas seal gap 14 between circumferential outer face 84A and circumferential inner face 44A may have a slightly larger width K of at least 5 mm, such as 6 mm. Furthermore, depending on the type of drive unit 2, seal gap 14 may have a width of 6 mm between protrusion face 84B and shoulder face 44B. In other embodiments, seal gap 14 may have different widths J, K.

Sprocket 4 further comprises a scraping member 20 configured to scrape off deposits accumulated in seal gap 14 between sprocket 4 and bearing housing 8. Scraping member 20 may comprise a first scraping element 20A with a thickness M provided on front face 42 of sprocket 4. Scraping member 20 may further comprise a second scraping element 20B with a thickness L provided on circumferential inner face 44A of sprocket 4. Thicknesses M and L of first and second scraping elements 20A, 20B, respectively, reduce widths J, K of seal gap 14, thereby preventing large particulates to enter seal gap 14. Exemplarily, thickness M of first scraping element 20A may be at least about 1 mm, such as about 2 mm, and thickness L of second scraping element 20B may be about 3 mm. In other embodiments, first and second scraping elements 20A, 20B may have different thicknesses M, L.

In some embodiments, first scraping element 20A may extend up to lateral surface 43, thereby almost completely covering front face 42 in radial direction from circumferential inner face 44A to lateral surface 43. Additionally, second scraping element 20B may extend up to shoulder face 44B, thereby almost completely covering circumferential inner face 44A in axial direction from shoulder face 44B to front face 42. In some embodiments scraping member 20 may also be a solid-type scraping member.

Figure 4:
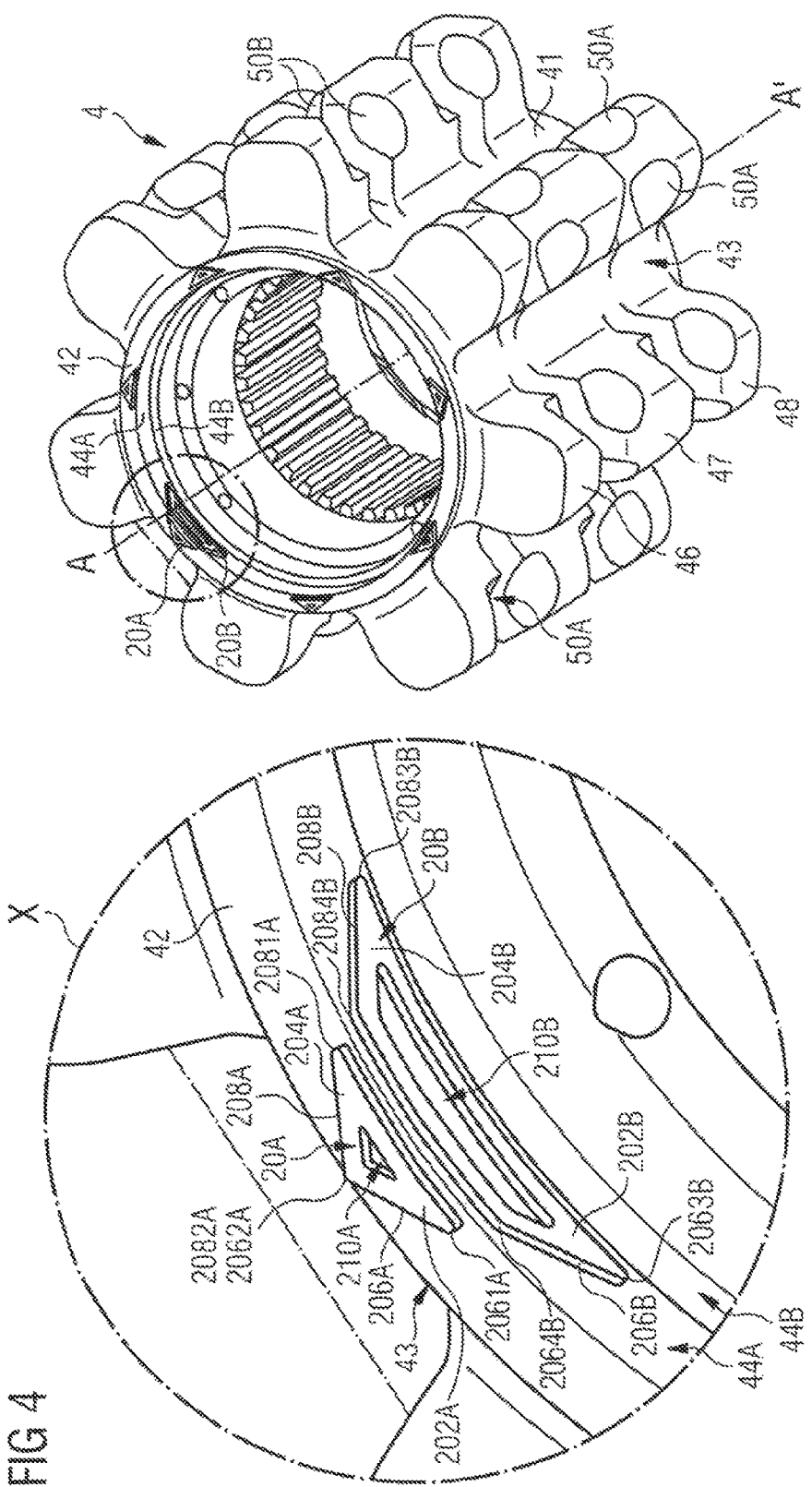
FIG. 4 shows a sprocket in perspective view with an exemplary scraping member provided thereon, as well as a detailed view (denoted by "X") of the scraping member.

FIG. 4 shows an exemplary sprocket 4 in perspective view with first scraping element 20A provided on front face 42 and second scraping element 20B provided on circumferential inner face 44A. To illustrate first and second scraping elements 20A, 20B more clearly, a detailed view denoted by "X" is shown on the left-hand side of FIG. 4. For clarity, elements already described in connection with FIGS. 1 to 3 have the same reference numerals, such as tooth elements 46, 47, 48 and front face 42.

As can be seen in FIG. 4, first scraping element 20A has a triangular shape. The skilled person will however appreciate that first scraping element 20A may have any other shape suitable for scraping off deposited material.

First scraping element 20A may comprise of a first leg 202A and a second leg 204A, the first and second legs 202A, 204A running obliquely opposite to each other to form the triangular shape. First leg 202A may comprise a first scraping edge 206A including a first end 2061A and a second end 2062A. Likewise, second leg 204A may comprise a second scraping edge 208A including a first end 2081A and a second end 2082A. Because first scraping element 20A has a triangular shape, second ends 2062A, 2082A may coincide. However, in other embodiments this may not be the case.

First scraping edge 206A and second scraping edge 208A run in radial direction from circumferential inner face 44A to lateral surface 43, which is why first and second scraping edges 206A, 208A may be referred to as radial scraping edges. As can be seen, radial scraping edges 206A, 208A may additionally run at an angle towards lateral surface 43, but again, in other embodiments this may not be the case.

Similar to first scraping element 20A, second scraping element 20B may include a third leg 202B and a fourth leg 204B. Again, third and fourth legs 202B, 204B may run obliquely opposite to each other, but not necessarily. Third leg 202B may comprise a third scraping edge 206B including a third end 2063B and a fourth end 2064B. Likewise, fourth leg 204B may comprise a fourth scraping edge 208B including a third end 2083B and a fourth end 2084B. In the embodiment shown here, second scraping element 20B has a trapezoidal shape, which is why fourth ends 2064B, 2084B do not coincide. Second scraping element 20B may, however, have other shapes where fourth ends 2064B, 2084B do coincide. Third ends 2063B, 2083B, and fourth ends 2064B, 2084B further have different axial distances from front face 42.

Third scraping edge 206B and fourth scraping edge 208B run in axial direction from shoulder face 44B to front face 42, which is why third and fourth scraping edges 206B, 208B may be referred to as axial scraping edges. As can be seen, axial scraping edges 206B, 208B may additionally run at an angle towards front face 42, but again this may not necessarily be the case.

Both first and second scraping elements 20A, 20B may be provided on the sprocket 4, such that radial scraping edges 206A, 208A and axial scraping edges 206B, 208B together form a deposit removal path. The deposit removal path is configured to guide scraped off deposits in axial direction along axial scraping edges 206B, 208B from shoulder face 44B to front face 42, and then along radial scraping edges 206A, 208A in radial direction from circumferential inner face 44A to lateral surface 43.

In some embodiments, a plurality of first scraping elements 20A may be provided on front face 42, thereby increasing the number of radial scraping edges 206A, 208A, and therewith increasing a radial scraping effect. In the embodiment shown in FIG. 4, one second scraping element 20B is illustrated, but other embodiments may comprise a plurality of second scraping elements 20B to also increase an axial scraping effect.

In some embodiments, first and second scraping elements 20A, 20B may additionally comprise inner recesses 210A, 210B. Inner recesses 210A, 210B may reduce the amount of material necessary in forming these scraping elements, thereby reducing frictional forces while scraping off deposits, and therewith the amount of heat being transferred into sprocket 4.

Figure 5:
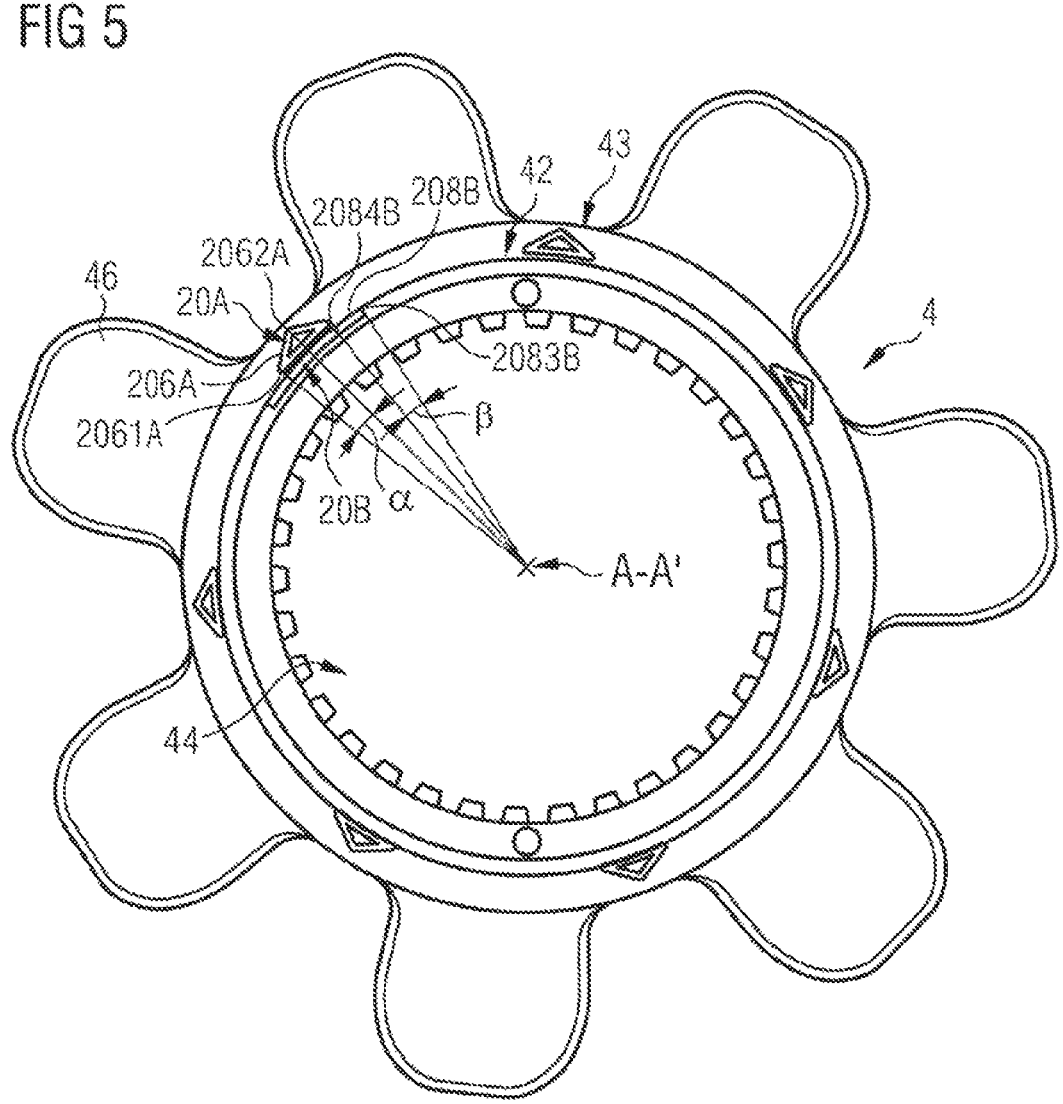
FIG. 5 is a front view of the sprocket depicted in FIG. 4.

To illustrate the aforementioned angular orientation of radial scraping edges 206A, 208A and axial scraping edges 206B, 208B more clearly, FIG. 5 shows a front view of sprocket 4 depicted in FIG. 4. Again, elements already explained in connection with the previous figures have the same reference numerals. For clarity, in FIG. 5 only one radial scraping edge 206A and one axial scraping edge 208B are exemplarily denoted with reference numerals.

As can be seen in FIG. 5, radial scraping edge 206A comprises first end 2061A and second end 2062A. First and second ends 2061A, 2062A have different radial distances from the axis of rotation A-A'. Additionally, if radial scraping edge 206A runs at an angle towards lateral surface 43, first end 2061A and second end 2062A may confine a polar angle $\alpha$ between them. Polar angle $\alpha$ may be equal to or greater than 0°, i.e. equal to or greater than 0 rad, and may be smaller than 180°, i.e. smaller than n rad 3.1416 rad. The skilled person will appreciate that a polar angle $\alpha$ of equal to 0° results in radial scraping edge 206A running exactly in radial direction from the axis of rotation A-A' to lateral surface 43.

Additionally, if second scraping element 20B comprises an axial scraping edge 208B running at an angle towards front face 42 (compare FIG. 4), third and fourth ends 2083B, 2084B of axial scraping edge 208B may confine a polar angle $\beta$ between them. Polar angle $\beta$ may be equal to or greater than 0°, i.e. equal to or greater than 0 rad. Depending on the dimensions of sprocket 4 and second scraping element 20B, polar angle β may be smaller than about 10°, i.e. smaller than about 0.1745 rad, such as 8.5° or 0.1484 rad. However, in some embodiments, polar angle β may have a larger or smaller upper limit.

In general, scraping member 20, such as first and second scraping elements 20A, 20B, may be made from any material suitable for scraping off deposits. Scraping member 20 may be made, for example, from iron, stainless steel, or other wear-resistant materials. Scraping member 20 may be attached to front face 42 and/or circumferential inner face 44A using any known method, such as welding, soldering, using adhesives, or the like.

In some embodiments, scraping member 20 may also be formed integrally on sprocket 4, for example, by providing recesses on front face 42 and/or circumferential inner face 44A. The recesses may be adapted to receive scraping member 20 and scraping member 20 may be attached within the recess using the aforementioned methods.

In some embodiments, scraping member 20 may be, for example, welded onto front face 42 and circumferential inner face 44A at a thickness of about 4 mm, and then, for example, cut down or milled down to thicknesses M, L.

In some embodiments scraping member 20 may also be removably attached to front face 42 and/or circumferential inner face 44A, such that scraping member 20 may be easily replaced, for example, when scraping member 20 is worn down after having scraped off deposits. Scraping member 20 may therefore be attached to front face 42 and/or circumferential inner face 44A by using fasteners such as bolts, screws or other known fasteners that provide for a nondestructive removal and/or replacing of scraping member 20.

Figure 6:
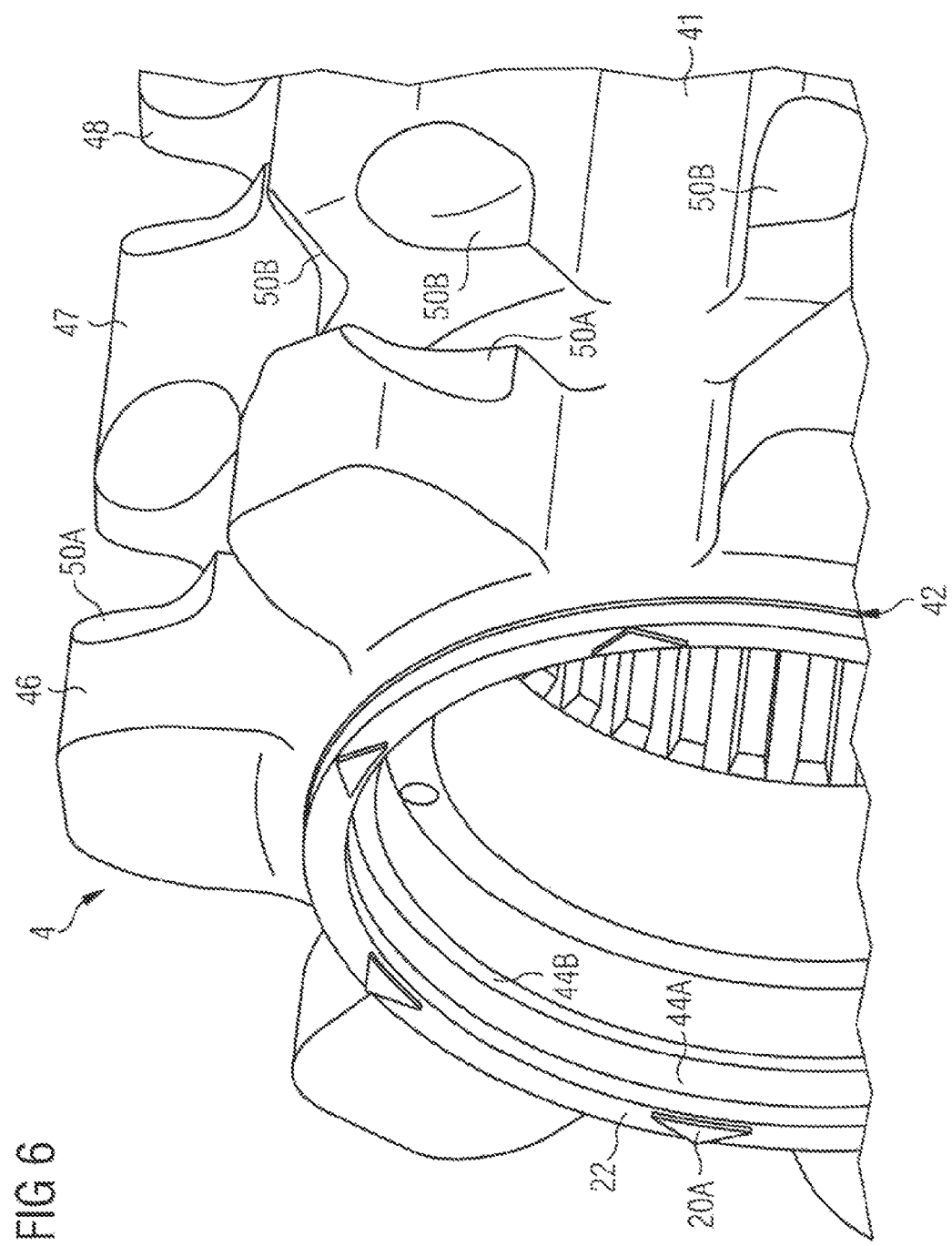
FIG. 6 shows another exemplary scraping member provided on a fastening ring attached to the sprocket.

FIG. 6 shows an exemplary embodiment of sprocket 4 including a fastening ring 22 with scraping member 20 provided thereon. Scraping members 20, such as first scraping elements 20A, may be removably or non-removably attached to fastening ring 22 using any known method, such as the aforementioned methods, and fastening ring 22 may be removably or non-removably attached to front face 42. In one embodiment, first scraping elements 20A may be, for example, welded onto fastening ring 22, and fastening ring 22 may be screwed onto front face 42 of sprocket 4. Thus, first scraping elements 20A, once worn down, may be replaced by replacing fastening ring 22.

In some embodiments, a second fastening ring may be used with second scraping elements 20B provided thereon (not shown in FIG. 6). In this embodiment, also second scraping elements 20B may be replaced by replacing the second fastening ring.

Figure 7:
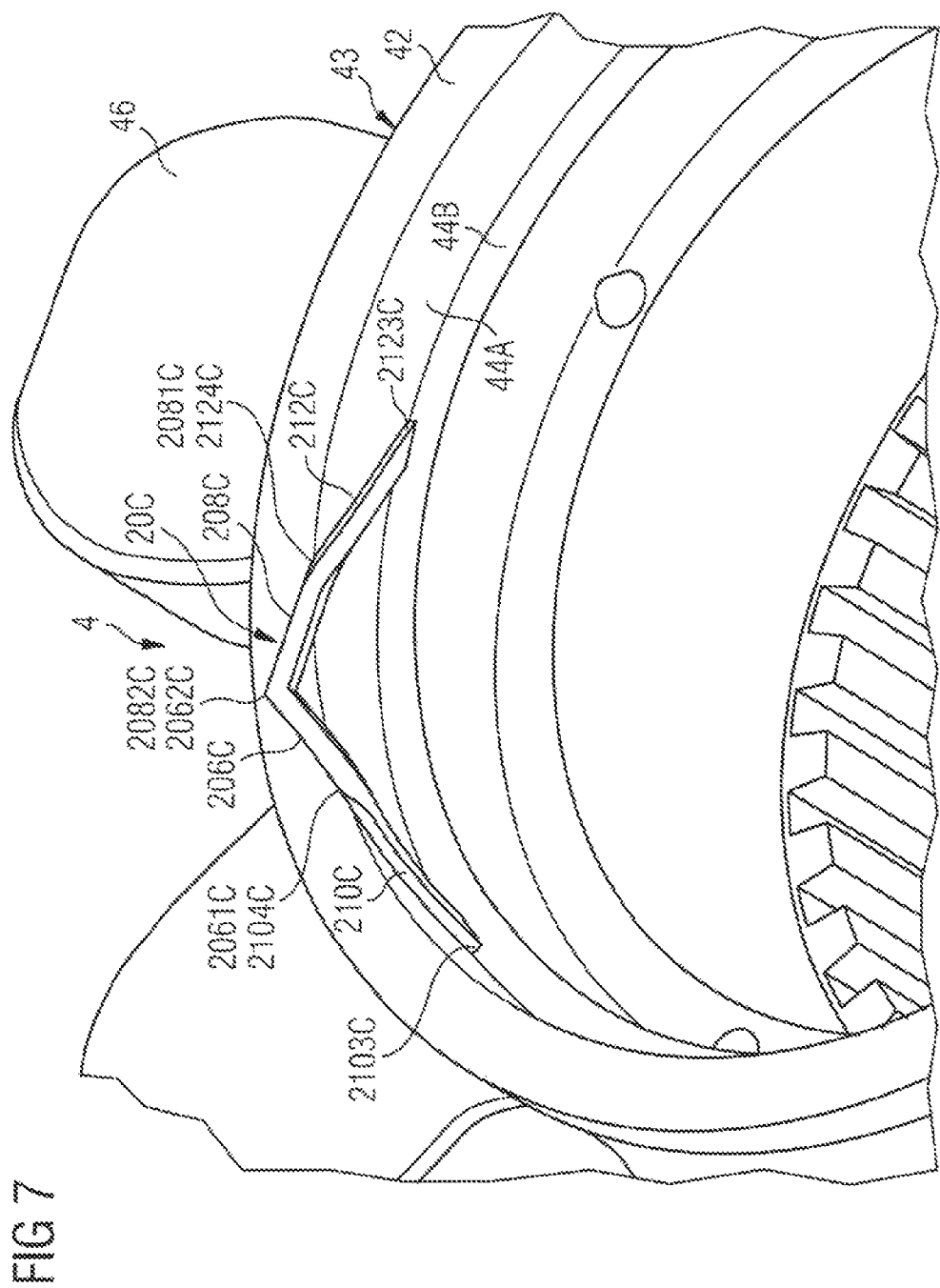
FIG. 7 shows another exemplary scraping member formed as a one-piece scraping element provided on the sprocket.

FIG. 7 shows another embodiment of the present invention, where scraping member 20 is provided as a one-piece scraping element 20C on sprocket 4. Analogue to the first and second scraping elements 20A, 20B, one-piece scraping element 20C may be removably, or non-removably attached to sprocket 4.

One-piece scraping element 20C comprises four legs. Two legs are provided on front face 42 including radial scraping edges 206C, 208C, and two legs are provided on circumferential inner face 44A including axial scraping edges 210C, 212C. Radial scraping edges 206C, 208C may further comprise first ends 2061C, 2081C and second ends 2062C, 2082C, and axial scraping edges 210C, 212C may further comprise third ends 2103C, 2123C and fourth ends 2104C, 2124C. Because radial scraping edges 206C, 208C and axial scraping edges 210C, 212C are comprised together in one piece, one-piece scraping element 20C may have a bend between radial scraping edges 206C, 208C and axial scraping edges 210C, 212C.

Moreover, radial scraping edges 206C, 208C may run at an angle towards lateral surface 43 and axial scraping edges 210C, 212C may run at an angle towards front face 42, as shown in FIG. 7. As a consequence, radial scraping edges 206C, 208C and axial scraping edges 210C, 212C of one-piece scraping element 20C provide a deposit removal path for scraped off deposits, similar to the removal path provided by first and second scraping elements 20A, 20B explained in connection with FIG. 4.

Figure 8:
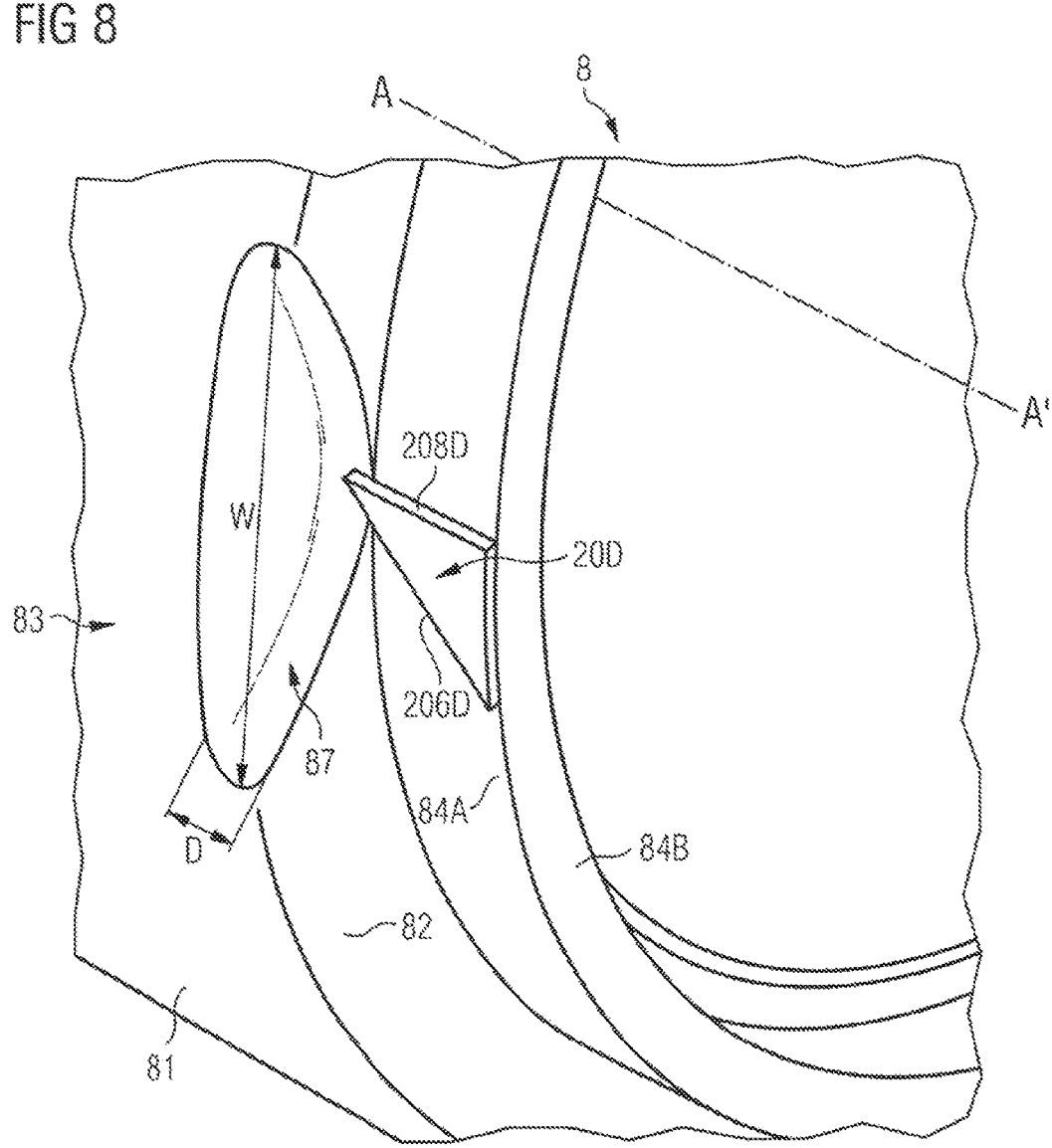
FIG. 8 illustrates a bearing housing of the drive unit with a scraping member provided thereon.

In general, scraping member 20 may additionally or alternatively be provided on front face 82 and/or circumferential outer face 84A of bearing housing 8. FIG. 8 shows an embodiment, where scraping member 20 is formed as a scraping element 20D provided on circumferential outer face 84A of annular protrusion 84. In contrast to the band-like shape of one-piece scraping element 20C, scraping element 20D is a solid-type scraping element, similar to first scraping members 20A shown in FIG. 6.

Scraping element 20D comprises a first scraping edge 206D and a second scraping edge 208D. In the exemplary embodiment, first scraping edge 206D runs at an angle from protrusion face 84B to front face 82, whereas second scraping edge 208D runs in axial direction from protrusion face 84B to front face 82. Depending on the direction of rotation of sprocket 4, either first scraping edge 206D or second scraping edge 208D may transport scraped off deposits towards front face 82.

Bearing housing 8 may further comprise a pocket 87 formed on front face 82, which opens out to lateral surface 83. Pocket 87 comprises a pocket width W (measured in circumferential direction of cylindrical body 81) and a pocket depth D (measured in axial direction of cylindrical body 81). As can be seen, pocket width W may increase from circumferential outer face 84A towards lateral surface 83, whereas pocket depth D may essentially be constant. In some embodiments, however, also pocket depth D may increase from circumferential outer face 84A to lateral surface 83.

In some embodiments, scraping element 20D may further protrude at least partially into pocket 87. Because pocket 87 locally increases width J of seal gap 14, pocket 87 may function as a removal zone for scraped off deposits, thereby allowing scraped off material to leave seal gap 14.

The skilled person will appreciate that the aforementioned methods for attaching scraping member 20 to sprocket 4 may be applied accordingly, when scraping member 20 is attached to bearing housing 8.

INDUSTRIAL APPLICABILITY

According to the present disclosure, sprocket 4, bearing housing 8, and scraping member 20 may be used in drive units of the series MR65 and MR 115 manufactured by Caterpillar Global Mining Europe GmbH and applied, for example, in chain scraper conveyors for underground mining applications. In such working environments, drive units are often exposed to a high amount of abrasive particulates due to a high particulate contamination of these working environments. As a result, particulates may enter seal gap 14 between sprocket 4 and bearing housing 8. Once particulates reach bearing 85, severe damage to bearing 85 and other components of drive unit 2 may be caused, resulting in a reduced lifetime of drive unit 2 and possibly less uptime of chain conveyor 100. However, scraping member 20 may also be used in other drive units exposed to high amounts of particulates, where a seal gap between a rotating body and a static bearing housing of the drive unit has to be constantly cleaned from deposits accumulated within the seal gap.

In the following, an exemplary mechanism for causing potential damage to components of the drive unit based on a particulate contamination of the seal gap is explained in connection with FIG. 3.

First, particulates enter seal gap 14 between bearing housing 8 and sprocket 4. The particulates get trapped in the relatively narrow gap, compress, and eventually clog up seal gap 14. Then, the trapped particulates absorb moisture of the ambient air, causing the material to adhere to the circumferential inner and outer faces 44A, 84A. This results in a permanently abrasive environment in the vicinity of shaft seal 86, eventually destroying the same. Once shaft seal 86 is destroyed, particulates may enter bearing 85, causing further damage to bearing 85, which may eventually result in a failure of bearing 85 and/or other components of drive unit 2.

In some cases, contamination of bearing 85 may be reduced by forming seal gap 14 in the shape of a labyrinth. The labyrinth-design of seal gap 14 increases the effective length of seal gap 14, thereby reducing the likelihood of particulates to reach shaft seal 86 and subsequently bearing 85. By using a labyrinth-design of seal gap 14, material wear of shaft seal 86 and/or bearing 85 may be reduced and the lifetime of drive unit 2 may be increased.

According to the present disclosure, the labyrinth-design of seal gap 14 is achieved by forming bearing housing 8 with an annular protrusion 84 configured to extend at least partially into central bore 44. Annular protrusion 84 and central bore 44 may have an overlap I of about 30 mm, which is larger than the overlap of current drive units.

However, in some cases a labyrinth-design of seal gap 14 may not be sufficient to prevent particulates from contaminating shaft seal 86 and/or bearing 85. Therefore, according to the present disclosure, scraping member 20 may additionally be provided on sprocket 4 and/or bearing housing 8. Scraping member 20 is configured to scrape off deposits accumulated within seal gap 14, thereby constantly cleaning seal gap 14 during operation of drive unit 2.

In the following, operating procedure of drive unit 2 including scraping member 20 is exemplarily explained in connection with FIGS. 3 to 5.

At a first step, first scraping element 20A may be attached, for example, to front face 42 of sprocket 4. As mentioned, first scraping element 20A may be first welded onto front face 42 and then cut down or milled down to thickness M.

At a next step, second scraping element 20B may be attached to circumferential inner face 44A of sprocket 4. Again, second scraping member 20B may be first welded and then cut down or milled down to thickness L. In some embodiments, second scraping element 20B may be attached prior attaching first scraping element 20A, depending on manufacturing practice.

Then, drive unit 2 is assembled. Assembling of drive unit 2 is performed by aligning sprocket 4 with bearing housing 8 coaxially about axis of rotation A-A' at width J to form seal gap 14.

During operation of drive unit 2, sprocket 4 rotates relative to bearing housing 8. When, during operation of drive unit 2, particulates enter seal gap 14, particulates may adhere to front face 82 and/or circumferential outer face 84A of bearing housing 8 and accumulate over time. Once accumulated particulates reach first and second scraping elements 20A, 20B, radial scraping edges 206A, 208A and axial scraping edges 206B, 208B may continuously scrape off deposited particulates. Because of the previously explained angular orientation of axial scraping edges 206B, 208B and radial scraping edges 206A, 208A, scraped off particulates are guided along axial scraping edges 206B, 208B towards front face 42 of sprocket, and then along radial scraping edges 206A, 208A towards lateral surface 43. By providing axial scraping edges 206B, 208B and radial scraping edges 206A, 208A at the previously explained angular orientation, a deposit removal path is formed that enables particulates to leave seal gap 14 from within the annular space between circumferential inner and outer faces 44A, 84A. Thus, almost the entire seal gap 14—including the labyrinth-like part between circumferential inner and outer faces 44A, 84A—may be cleaned from particulates using first and second scraping elements 20A, 20B.

In some embodiments, where scraping member 20 is formed as one-piece scraping element 20C, deposits may be guided out of seal gap 14 in a similar manner by axial scraping edges 210C, 212C and radial scraping edges 206C, 208C (see FIG. 7).

When scraping member 20 is provided on sprocket 4, scraping off deposits and removal of scraped off particulates is performed actively, because radial scraping edges 206A, 208A; 206C, 208C and axial scraping edges 206B, 208B; 210C, 212C actively scrape off the particulates during rotation of sprocket 4 relative to bearing housing 8.

In some embodiments, where scraping member 20 is provided on front face 82 and/or circumferential outer face 84A of bearing housing 8, such as scraping element 20D in FIG. 8, scraping may be performed passively, because bearing housing 8 does not rotate. In these embodiments, rotation of sprocket 4 in clockwise direction may transport scraped off particulates towards first scraping edge 206D, and rotation of sprocket 4 in anti-clockwise direction may transport scraped off particulates towards second scraping edge 208D, thereby causing a scraping effect.

In some embodiments, as shown in FIG. 8, bearing housing 8 may further comprise pocket 87 formed on front face 82. In some embodiments, scraping element 20D may additionally protrude at least partially into pocket 87, thereby guiding scraped off particulates towards pocket 87. When, during operation of drive unit 2, particulates are guided towards pocket 87, for example, by first scraping edge 206D, these particulates may be removed from seal gap 14 more easily, because pocket 87 locally increases width J of seal gap 14, thereby reducing a flow resistance in seal gap 14.

By using aspects of this disclosure, drive units exposed to a high particulate contamination, such as in underground mining applications, may receive improved protection against these particulates. Therefore, potential damage to components of these drive units, such as bearings or seals, may be reduced and uptime of the drive units may be increased.

Although the preferred embodiments of this invention have been described herein, improvements and modifications may be incorporated without departing from the scope of the following claims.

The invention claimed is:

1. A sprocket for a drive unit of a chain conveyor for underground mining applications, the sprocket comprising:
   a cylindrical body having a front face, an axis of rotation (A-A'), and a lateral surface; and
   a scraping member provided on the front face, and configured to scrape off deposits during rotation of the sprocket, the scraping member including at least one radial scraping edge provided on the front face, the at least one radial scraping edge including a first end and a second end, wherein the first end and the second end have different radial distances from the axis of rotation (A-A'), and wherein the first end and the second end confine a polar angle α of 0°≤α<180°.

2. The sprocket according to claim 1, further comprising a central bore extending from the front face into the cylindrical body, the central bore including a circumferential inner face, wherein the scraping member extends at least partially into the circumferential inner face.

3. The sprocket according to claim 2, wherein the scraping member further comprises at least one axial scraping edge provided on the circumferential inner face, the at least one axial scraping edge including a third end and a fourth end, wherein the third end and the fourth end have different axial distances from the front face, and wherein the third end and the fourth end confine a polar angle β of β≥0°.

4. The sprocket according to claim 3, wherein the at least one radial scraping edge and the at least one axial scraping edge together define a deposit removal path, wherein the deposit removal path is configured to guide scraped off deposits in an axial direction towards the front face and in a radial direction towards the lateral surface.

5. The sprocket according to claim 2, wherein the scraping member is a set of multiple scraping elements.

6. The sprocket according to claim 5, wherein the set of multiple scraping elements further comprises:

at least one first scraping element, wherein the at least one first scraping element is provided on the front face and includes the at least one radial scraping edge, and at least one second scraping element, wherein the at least one second scraping element is provided on the circumferential inner face and includes at least one axial scraping edge.

\* \* \* \* \*